Oct. 15, 1968  F. G. THEARLE  3,405,537
FLEXIBLE TRANSMISSION SHAFT
Filed Oct. 20, 1966
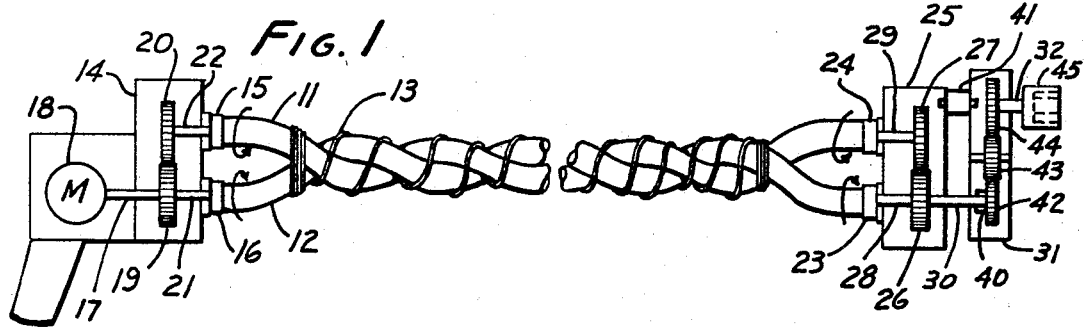
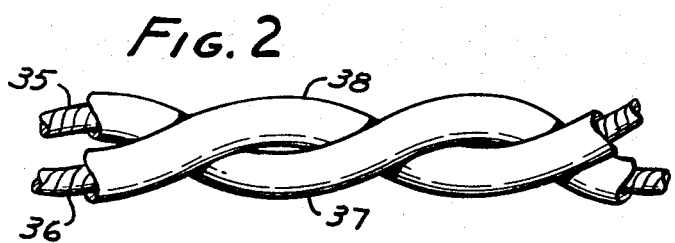
INVENTOR.
FREDERICK G. THEARLE
BY
ATTORNEYS.

United States Patent Office 3,405,537
Patented Oct. 15, 1968

3,405,537
FLEXIBLE TRANSMISSION SHAFT
Frederick G. Thearle, Lomita, Calif., assignor to Hi-Shear Corporation, Torrance, Calif., a corporation of California
Filed Oct. 20, 1966, Ser. No. 588,132
12 Claims. (Cl. 64—2)

ABSTRACT OF THE DISCLOSURE

A flexible transmission shaft according to the present disclosure comprises a pair of flexible shafts, each contained within a sheath and twisted around each other and around a nominal axis. Securing means is provided for securing the sheaths together. Transmission means is provided for rotating one end of each shaft in opposite directions, and receiving means is provided for recombining the rotational energy from each shaft.

Specification

This invention relates to flexible transmission shafts, and to a flexible transmission shaft in combination with a driver and a driven apparatus such as a handtool.

An object of the present invention is to provide a flexible shaft which is substantially resistant to kinking and binding.

Flexible shafts are useful for imparting rotational energy from a driving motor to a socket or the like in portable machinery such as hand tools. When subjected to torsion, known flexible shafts tend to kink, bind and whiplash. Such kinking, binding and whiplashing create a hazard to operators and may disable the device. Thus, for devices in which a flexible shaft is desired, such as in driving a fastener which is inaccessible to non-bending drivers, it is useful to provide one which will not kink, bind or whiplash and which will reliably drive a fastener whose axis is offset or even skew to that of the driving motor.

According to the present invention, a pair of flexible shafts are bound together for a substantial distance along their length. Transmission means is provided for rotating each shaft in an opposite direction. The provision of two bound shafts which are rotating in opposite directions reduces any tendency for one shaft to bind or kink by creating an equal and opposite resisting force due to the tendency of the other shaft to bind or kink in an opposite direction. Thus, kinking, binding and whiplashing as heretofore experienced, are eliminated.

A feature of the present invention resides in transmission means for diverting the rotational energy of a driver into two components and applying each component to a separate one of two flexible shafts, so that each shaft rotates in an opposite direction. Means is provided at the opposite end of said shaft for recombining the rotational energy.

According to a preferred but optional feature of this invention, the flexible shafts are twisted around each other.

The above and other features of this invention will be fully understood from the following detailed description and accompanying drawings, in which:

FIG. 1 illustrates an installation of the flexible shaft of a preferred form of the present invention; and FIG. 2 illustrates a flexible shaft for use in the installation of FIG. 1.

According to the preferred form of the present invention, a pair of flexible shafts 11 and 12 are lashed together by a suitable lashing means or wire 13 for a substantial length. Shafts 11 and 12 are connected to transmission means 14 by suitable connectors 15 and 16.

Flexible shafts 11 and 12 may optionally be twisted or interwound about each other and around a nominal axis for substantially their entire lengths.

Transmission means 14 includes a shaft 17 for connection to a suitable source of rotational energy, for example, motor 18. First spur gear 19 is connected to shaft 17 and drives second spur gear 20. Drive shafts 21 and 22 connect spur gear 19 to flexible shaft 12 and spur gear 20 to flexible shaft 11, respectively.

The opposite ends of the flexible shafts 11 and 12 are connected by suitable connectors 23 and 24 to receiving means 25. Receiving means 25 includes a pair of meshing spur gears 26 and 27. Shaft 28 connects spur gear 26 to one of the flexible shafts through connector 23, while shaft 29 connects spur gear 27 to the other flexible shaft through connector 24. One of the gears, for example, spur gear 26, is connected to output drive shaft 30. Connector 40 is provided on shaft 30 for connection to a suitable portable tool.

If desired, an offset adapter 31 may be connected to connector 40. Adapter 31 is secured to receiving means 25 by tongue 41, and includes a series of spur gears 42, 43 and 44 for delivering rotational energy from drive shaft 30 to shaft 32. Shaft 32 is adapted to be connected to a suitable portable tool 45.

Gears 19 and 20 in transmission means 14 preferably have the same number of teeth, and gears 26 and 27 in receiving means 25 also preferably have an equal number of teeth. It is understood, however, that the number of teeth on the gears in the transmission means may differ from that on the gears in the receiving means.

In practice, a suitable source of rotational energy is applied to shaft 17, so as to rotate that shaft in a first direction, for example, counterclockwise. Shaft 17 drives gear 19, drive shaft 21 and flexible shaft 12 in a similar, first direction. Gear 19 imparts rotational movement to gear 20 in the opposite direction, for example, clockwise, which movement is imparted to drive shaft 22 and flexible shaft 11. Flexible shafts 11 and 12 therefore rotate in opposite directions. Thus, the rotational energy applied in shaft 17 is divided between flexible shafts 11 and 12 by gears 19 and 20.

The flexible shafts are connected to shafts 28 and 29 in receiving means 25, so as to rotate shafts 28 and 29 in opposite directions. For example, shaft 28 may be rotated in a counterclockwise direction while shaft 29 will be rotated in a clockwise direction. Gears 26 and 27 in receiving means 25 serve to recombine the divided rotational energy and supply that energy to shaft 30.

The direction of rotation of shaft 30 may be reversed by interchanging the flexible shaft connections at either the drive assembly or the receiving means. By connecting flexible shaft 11 to shaft 28 through connector 23, and by connecting flexible shaft 12 to shaft 29 through connector 24, shaft 28 will rotate in the clockwise direction and shaft 29 will rotate in the counterclockwise direction. By reversing these connections the direction of rotation of shaft 30 will likewise be reversed so that shaft 30 will rotate in the counterclockwise direction.

With flexible shafts 11 and 12 secured together, and when subject to torsion through shafts 21 and 22, each shaft tries to kink in a direction opposite to the other. Because the shafts are secured together, they are mutually restrained from kinking. Shaft 11 prevents shaft 12 from kinking in one direction due to the tendency of shaft 11 to kink in the opposite direction, and vice versa.

Flexible shafts 11 and 12 may be any suitable type of flexible shaft. For example, as illustrated in FIG. 2, shafts 11 and 12 are preferably cable shafts 35 and 36 encased within suitable encasing means or sheaths 37 and 38, respectively.

The present invention provides a kinkless flexible shaft for delivering rotational energy to machinery, such as hand tools. The shaft is reliable, inexpensive and requires a minimum of maintenance.

This invention is not to be limited by the embodiment shown in the drawings and described in the description, which is given by way of example and not of limitation, but only in accordance with the scope of the appended claims.

What is claimed is:

1. A pair of flexible shafts each having an axis and two ends, said shafts being twisted around each other and around a nominal axis; a sheath around each of said shafts; securing means for securing said sheaths together between the two ends of said shafts; transmission means adapted to rotate one end of each of said shafts in opposite directions about their respective axes; and receiving means adapted to be connected to the end of each of said shafts opposite said one end for combining rotational energy from each of said shafts.

2. Apparatus according to claim 1 wherein said transmission means comprises connecting means adapted to connect one shaft to a source of rotational energy, said connecting means being adapted to rotate said one shaft in a first direction about its axis, and first coupling means adapted to rotate the other shaft in a direction about its axis opposite to the direction of rotation of said one shaft.

3. Apparatus according to claim 2 wherein said first coupling means comprises a first meshing gear assembly.

4. Apparatus according to claim 3 wherein said receiving means includes second coupling means connected to each of said shafts for rotationally coupling said shafts together.

5. Apparatus according to claim 4 wherein said second coupling means comprises a second meshing gear assembly.

6. Apparatus according to claim 1 wherein said receiving means includes second coupling means connected to each of said shafts for rotationally coupling said shafts together.

7. Apparatus according to claim 6 wherein said second coupling means comprises a second meshing gear assembly.

8. In combination: a driver adapted to produce rotational movement about an axis; a pair of flexible shafts each having two ends and an axis, said shafts being twisted around each other and around a nominal axis; a sheath around each of said shafts; securing means for securing said sheaths together between the two ends of said shafts; transmission means adapted to be connected to said driver for rotating one end of each of said shafts in opposite directions about their respective axes; receiving means adapted to be connected to the end of each of said shafts opposite said one end for combining rotational energy from each of said shafts; and driven means adapted to be connected to said receiving means and adapted to be rotated about an axis by said receiving means.

9. Apparatus according to claim 8 wherein said transmission means comprises connecting means adapted to connect one of said shafts to said driver, said connecting means being adapted to rotate said one shaft in a first direction about its axis, and first coupling means adapted to rotate the other shaft in a direction opposite to the direction of rotation of said one shaft.

10. Apparatus according to claim 9 wherein said first coupling means comprises a first meshing gear assembly.

11. Apparatus according to claim 8 wherein said receiving means includes second coupling means connected to each of said shafts for rotationally coupling said shafts together.

12. Apparatus according to claim 11 wherein said second coupling means comprises a second meshing gear assembly.

References Cited

UNITED STATES PATENTS 1,450,284  4/1923  Goldschmidt _____ 64—2

FOREIGN PATENTS 391,702  5/1933  Great Britain.

HALL C. COE, *Primary Examiner.*